Patented July 9, 1946

2,403,465

UNITED STATES PATENT OFFICE 2,403,465

TREATMENT OF HYDROXYL-CONTAINING INTERPOLYMERS OF ETHYLENE

Donald Cargill Pease, Wilmington, Del., assignor to E. I. du Pont de Nemours & Company, Wilmington, Del., a corporation of Delaware No Drawing. Application December 18, 1942, Serial No. 469,460

11 Claims. (Cl. 260—42)

This invention relates to polymeric materials and more particularly to the treatment of hydrolyzed interpolymers of ethylene and vinyl compounds containing organic groups hydrolyzable to hydroxyl groups whereby to form polymeric materials having generally improved physical characteristics.

An object of this invention is to provide a new class of film- and filament-forming polymeric materials.

Another object is to provide a new class of polymeric materials derived from hydrolyzed interpolymers of ethylene and a vinyl compound containing organic groups hydrolyzable to hydroxyl groups, said polymeric materials having higher melting points, lower water-sensitivity, lower solubility in organic solvents and generally improved physical characteristics over the hydrolyzed interpolymers from which they are derived.

A further object is to treat hydrolyzed interpolymers of ethylene and a vinyl organic ester to increase the melting point, to decrease the water-sensitivity, to decrease the solubility, and to improve the properties thereof generally.

These and other objects will more clearly appear hereinafter.

The above objects are accomplished by my invention which, briefly stated, comprises reacting hydrolyzed interpolymers of ethylene and a vinyl organic compound in which less than 45% of the carbon atoms of the polymer chain are attached to groups from the class consisting of hydroxyl groups and organic groups hydrolyzable to hydroxyl groups (i. e., ester, ether, and acetal groups), with compounds having a plurality of methylene groups each of which is attached to nitrogen and oxygen.

The hydrolyzed polymer preferred in the practice of the present invention is that formed by the hydroylsis of the interpolymer of ethylene with an organic ester such as vinyl acetate, and the invention will be further illustrated with specific reference to this interpolymer although it is to be understood that my invention is applicable as well to the treatment of all hydroxylated interpolymers of ethylene and vinyl compounds wherein less than 45% of the carbon atoms of the polymer chain are attached to hydroxyl groups and groups hydrolyzable to hydroxyl groups, whether the interpolymer is formed from vinyl organic esters, ethers or acetals, or other suitable intermediates.

The polymerization of the monomeric ethylene and vinyl acetate can be carried out in aqueous emulsion in the presence of catalysts such as ammonium persulfate or benzoyl peroxide at temperatures generally above 60° to 75° C. After several hours the polymer is taken out of the reaction vessel and unreacted vinyl acetate is steam distilled off. Hydrolysis of these polyesters is carried out by dissolving them in alcohol or a toluene- or benzene-alcohol mixture, and adding an alcoholic solution of sodium or potassium hydroxide. Systems containing a substantial amount of water are also useful for the hydrolysis. After hydrolysis has proceeded to the desired extent, the solvents are steam distilled and the residual polymer washed and dried.

The molar ratio of ethylene to vinyl acetate in the interpolymer must be greater than 1:9 to satisfy the requirement that less than 45% of the carbon atoms of the polymer chain be attached to hydroxyl groups and organic groups hydrolyzable to hydroxyl groups. The preferred range of mole ratios is from 5:1 to 1:3, corresponding to from 8⅓% to 37½% of the carbon atoms attached to hydroxyl groups.

For most purposes it is desirable to use a product that is hydrolyzed to the extent of 60–100%. In the event that the ultimate use requires a high degree of pliability, a product hydrolyzed about 75–85% is preferred, since the residual ester groups provide a relatively permanent plasticizing action. On the other hand, for a use demanding an ultimately higher stiffness and/or tensile properties, it is recommended that the polyesters be hydrolyzed 95–100%.

The compounds characterized by having plurality of methylene groups, each of which is attached to nitrogen and oxygen, and hereinafter termed "reactive modifying agent," are represented by the following examples: dimethylolurea and its various ethers such as N,N'-bis-(methoxymethyl) urea, the aldehyde condensation products of triazine with at least two methylene groups, each of which is attached to nitrogen and oxygen, such as trimethylol melamine and the alkyl ethers of trimethylol melamine, poly-N-methylol derivatives of such polyamides as succinamide and adipamide, and monocyclic ureas having on each of the urea nitrogens a substituent of the formula —$CH_2OR$ such as N,N'-bis-(methoxymethyl) uron. While amounts up to 50% by weight, based on the weight of the hydrolyzed interpolymer, of these compounds give substantial modification of the hydroxyl-containing polymer, I prefer to use from about 0.1% to about 30% by weight of the reactive modifying agent.

In the preferred practice of the invention the hydrolyzed interpolymer, e. g. hydrolyzed ethylene-vinyl acetate interpolymer, and the reactive modifying agent, together with a suitable condensation catalyst such as hydrochloric or toluenesulfonic acid, are intimately associated in a volatile organic solvent medium. The resulting composition is then cast into film or converted into any other desired form by a suitable casting, extrusion, or molding operation carried out at the lowest possible practical working temperature. Thereafter the organic solvent is removed and the treatment is completed by subjecting the solvent-free composition to temperatures of from 70° to 200° C. for a period of time sufficient to produce a high-melting, insoluble product, usually from about 1 to 3 hours.

The following examples further illustrate the invention. Parts are by weight, and the several terms and tests therein employed are defined as follows:

"Cold crack temperature" is determined by fitting a sample of film approximately ¼" x 2" in the open jaws of a wooden test tube holder and immersing in a cooling bath of known temperature. After one minute a trigger is released, causing the jaws of the holder to strike sharply on a 180° fold in the sample. The temperature at which the first perceptible break is made in the sample is termed the cold crack temperature.

"Melting point" is the temperature at which a film has zero tensile strength.

"Mar temperature" is the temperature to which films need be heated in order to accept a permanent imprint when pressed between the forefinger and thumb.

"Tack temperature" is the temperature to which a folded sample of film need be heated in order to stick together when pressed between the thumb and forefinger.

"Stiffness" in lbs./sq. in. is equal to the stress in pounds exerted upon a film at 1% elongation divided by $\frac{1}{100}$ of the cross sectional area in square inches of the unstretched film.

"Pliability" is $10^6$ times the reciprocal of the stiffness.

"Flex durability" values are obtained on the Schiltknecht flex machine. The test consists in bending a 3" x 2" piece of film into the form of a cylinder and collapsing and restoring the cylinder longitudinally at a rate of about 400 cycles per minute. The sample is inspected periodically and the flex durability is taken as the number of cycles necessary to crack the film.

Example I

To a solution of 15 parts of a hydrolyzed ethylene-vinyl acetate interpolymer having a mole ratio of 1:1.2, 87% hydrolyzed (22% of the carbon atoms of the polymeric chain attached to hydroxyl and 5% attached to acetoxy groups) in 85 parts of toluene-ethanol 1:1 mixture is added 2 parts of dimethylolurea and 0.035 part of hydrochloric acid. A film is cast by flowing this solution on a smooth surface and evaporating the solvent at room temperature. After baking at 100° C. for 1 hour, the unsupported film has a melting point of over 200° C., tack temperature of 88° C., mar temperature of 114° C., cold crack temperature of −13° C., tensile strength of 3000 lb./sq. in. with 165% elongation, and a pliability of 181. A control sample of film unmodified by reaction with dimethylolurea has a tenacity of 3300 lbs./sq. in. with elongation of 340%, pliability of 121, melting point of 120° C., tack temperature 76° C., mar temperature 99° C., and cold crack of −10° C. Another portion of the cast film was baked under an infrared lamp for ¾ hour. It still remained insoluble after 10 minutes in boiling toluene/ethanol (1:1) mixture while control film dissolved in this hot solvent mixture in less than one minute.

Example II

A hydrolyzed ethylene-vinyl acetate interpolymer having a mole ratio of 2.9:1, 83% hydrolyzed (11% of the carbon atoms of the polymer chain attached to hydroxyl groups and 2% attached to acetoxy groups) is pressed into films at 150° C. The film is soaked in a solution composed of 95 parts of dioxane, 5 parts of N,N'-bis(methoxymethyl)uron and 0.05 part of toluene sulfonic acid for 15 hours at 25° C. The dried film is baked 2 hours at 70° C. After one month at 25° C., it is found that the melting point is above 300° C. The treated film has a tenacity of 3000 lbs./sq. in. with 200% elongation, and a pliability of 110. Films of the same composition that had not been chemically altered by reaction with N,N'-bis-(methoxymethyl)uron have a tenacity of 3500 lbs./sq. in. with 400% elongation and a melting point of 98° C.

Example III

Ten parts of a completely hydrolyzed ethylene-vinyl acetate interpolymer, having a mole ratio of 1:2.3 (35% of the carbon atoms in the polymer chain attached to hydroxyl groups) is swollen at the boiling point of a mixture of toluene and ethanol (1:1). One part of N,N'-bis(methoxymethyl)uron and 0.1 part of diethylmethylsulfonium iodide is added to this mixture with stirring after which the solvents are allowed to evaporate at room temperature. After drying at 60° C. for 12 hours, the mixture of interpolymer, reactive agent and catalyst is heated in a mold under 50 lbs./sq. in. pressure for 2 hours at 185° C. The product has a melting point above 250° C., and at room temperature possesses a tough, rubbery character. Moldings of the polymer which have not undergone this reaction just described have a melting point of 180° C. and are quite stiff and brittle. Larger proportions of N,N'-bis)methoxymetyl)uron as used in this reaction yield products having increased stiffness and high melting points.

Example IV

To a solution of 50 parts of hydrolyzed ethylene-vinyl acetate interpolymer having a mole ratio of 3.6:1, 90% hydrolyzed (9.9% of the carbon atoms in the polymer chain attached to hydroxyl and 1.1% attached to acetoxy groups), dissolved in 300 parts of 1:1 toluene-ethanol mixture is added 15 parts of N,N'-bis(methoxymethyl)urea. Films are cast from this solution more easily than those containing no modifying agent. After baking at 80°–85° C. for 1½ hours the film modified with N,N'-bis(methoxymethyl)urea had a melting point of 160° C., cold crack of −45° C., tack temperature of 75° C., and mar temperature of 70° C. The control unreacted films have a melting point of 93° C., cold crack temperature of −5° C., tack temperature of 73° C. and mar temperature of 90° C.

Example V

Sixteen parts of a hydrolyzed ethylene-vinyl acetate interpolymer having a mole ratio of 1.6:1, 83% hydrolyzed (16% of the carbon atoms of the polymer chain attached to hydroxyls and 3% attached to acetoxy groups), is dissolved in 100 parts of toluene-ethanol 1:1 mixture, 0.48 part of dimethylolurea is added to the solution with stirring and just before films are cast there is added 0.02 part of ammonium dihydrogen phosphate. After drying the film is baked one hour at 100° C. The product of the chemical interaction of dimethylolurea and the polyalcohol has a tenacity of 3000 lbs./sq. in. with an elongation of 250%, pliability of 85, cold crack temperature of −20° C., and melting temperature over 200° C. A control film that has not been subjected to this chemical reaction has a tensile strength of 1800 lbs./sq. in. with 220% elongation, pliability 67, cold crack 8° C., and a melting point of 89° C.

Example VI

Eight parts of hydrolyzed ethylene-vinyl acetate interpolymer having a mole ratio of 3:1, 83% hydrolyzed (10% of the carbon atoms in the polymer chain attached to hydroxyls and 2.5% attached to acetoxy groups), is dissolved in 50 parts of hot benzene-ethanol (1:1) mixture. 0.24 part of dimethylolurea is added, and just previous to casting these films 0.025 part of ammonium dihydrogen phosphate is added. After the film has been dried at 75° C. for one day, it has a tenacity of 3800 lbs./sq. in. with 340% elongation, pliability of 91, melting point of 175° C., and a cold crack of −50° C. Unsupported films are flexed 1,500,000 times without failure. Control films that have not been subjected to chemical modification have a tenacity of 3200 lbs./sq. in. with 440% elongation, melting point of 95° C., and failed before 200,000 flexes.

Example VII

A hydrolyzed ethylene-vinyl acetate interpolymer having a mole ratio of 1.6:1, 90% hydrolyzed (17% of the carbon atoms in the polymer chain attached to hydroxyl groups and 2% attached to acetoxy groups) mills to a smooth sheet on even speed rolls at 80° C., but the temperature range is rather narrow as the polymer sticks badly at higher temperatures. This material has a mar temperature of 70° C. and a cold crack temperature of 5° C. A mixture of 10 parts of this polymer and 1 part of N,N'-bis(methoxymethyl)uron and 1% ammonium chloride catalyst can be successfully milled at 60° C. When this mixture is calendered on a fabric at 60° C. and baked for one hour at 100° C., it is found to have a mar temperature of 150° C. and a cold crack of −20° C.

It is to be understood, of course, that the above examples are for purposes of illustration and that the invention is not limited to the exact materials and conditions therein described but is susceptible rather to considerable variation.

Thus, while the preferred mole ratio of ethylene to vinyl acetate in the ethylene-vinyl acetate interpolymer lies within the range of 5:1 and 1:3 (8⅓% to 37½% of the carbon atoms in the polymer chain attached to hydroxyl groups), for some uses it is possible to secure sufficient modification by the present chemical treatment to render polymers having a ratio of ethylene/vinyl acetate of 49:1 (1% of the carbon atoms of the polymer chain attached to hydroxyl groups or groups hydrolyzable to hydroxyls), useful in certain applications. Furthermore, hydrolyzed ethylene-vinyl acetate interpolymers having an ethylene/vinyl acetate ratio in the range of 1:3 to 1:9 (hydroxyls on 37½% to 45% of the carbon atoms in the polymer chain) respond to the treatment of this invention to yield products of substantially higher melting points and decreased solubility. It is quite unexpected that these modifying agents would so considerably enhance the properties of hydrolyzed ethylene-vinyl acetate interpolymers that possess fewer reactive hydroxyl groups than polyvinyl alcohol when the same modifying agents confer far less improvements upon the latter.

A variety of methods are available for incorporating into the hydrolyzed ethylene-vinyl acetate interpolymers reactive modifying agents having a plurality of methylene groups, each of which is attached to nitrogen and oxygen. The reactive modifying agents can be added to solutions of the hydrolyzed ethylene-vinyl acetate interpolymers in organic solvents; the formed objects of hydrolyzed ethylene-vinyl acetate interpolymer can be treated directly with the agent or solutions of it; or the agent can be worked into the polymer on conventional milling or calendering equipment. Solvents that have been used in these procedures are usually permitted to evaporate and the objects are baked at temperatures somewhat below those that cause their deformation. Catalysts such as sulfonic acids or mineral acids or their acidic salts can be incorporated with the modifying agent or can be added later from the vapor phase or in any manner that will not extract large quantities of polymer or modifying agent. By using temperatures that accelerate the reaction between the hydrolyzed ethylene-vinyl acetate interpolymer and the modifying agent for only short periods, it is possible to soften the polymer sufficiently to permit it to be worked or to be formed into shapes that are rendered relatively permanent by further heat or catalytic treatment.

The melting point of objects made from untreated hydrolyzed ethylene-vinyl acetate interpolymer having a mole ratio of 3:1 is about 110° C. As the hydroxyl content of the polymer increases, the melting point increases, so that a completely hydrolyzed polymer of ethylene-vinyl acetate having a mole ratio of 1:3 melts at about 170° C. The products of the reaction between hydrolyzed ethylene-vinyl acetate interpolymers and the reactive modifying agents described in this invention frequently do not melt until temperatures over 200° C. have been attained and are in every instance substantially higher melting than the corresponding untreated polymer. The increase in melting point will of course depend on the chemical composition of the product as determined by the proportions of the reactants, i. e. polymer and reactive modifying agent, the conditions for chemical reaction, ethylene/vinyl acetate ratio, and degree of hydrolysis.

Moisture absorption which normally increases with increase in hydroxyl content in the polymeric material is greatly reduced by the treatments of this invention thus advantageously yielding a product with physical properties less easily influenced by changes in humidity.

The stiffness of the final product can be adjusted by the proportions of the modifying agents used. Larger proportions of the agents ordinarily lead to products with higher stiffness. Substantially completely hydrolyzed ethylene-vinyl acetate interpolymer having a mole ratio of 3:1 (12½% of the carbon atoms in the polymer chain are attached to hydroxyls) has a dry tenacity of about 3,000 lbs./sq. in. with 300% elongation and a stiffness of about $0.15 \times 10^6$ lbs./sq. in. at 50% R. H. The stiffness is unchanged or may even be slightly decreased by about 1% by weight of the modifying agent while 10% of the same modifying agent usually doubles the stiffness. Both tenacity and stiffness increase with hydroxyl content so that by selecting the hydrolyzed ethylene/vinyl acetate ratio of the unreacted polymer and the quantity of modifying agent added, with a view to what is ultimately desired in tenacity and stiffness, it is possible to obtain useful products with a considerable range in stiffness and tenacity. Substantially completely hydrolyzed ethylene-vinyl acetate interpolymer having a mole ratio of 1:3 (37½% of the carbon atoms in the polymer chain attached to hydroxyls) modified according to this invention has a tenacity of about 6,000 lbs./sq. in. with 200% elongation and a stiffness of 0.5–1.0×10⁶ lbs./sq. in. at 50% relative humidity.

For such uses as fabric coatings where high pliability and low stiffness is desired, a 1:1 or higher, e. g. 3:1, composition with small amounts of modifying agent is recommended. The products of reaction from the 1:3 composition and larger amounts of the polyfunctional reagents have higher stiffness and tenacity, rendering them useful as unsupported objects to accept stresses in longitudinal or transverse directions.

If the hydrolyzed ethylene-vinyl acetate interpolymer containing the reactive modifying agent and catalyst has not been given sufficient heat treatment to render it unworkable, it is possible to add other reactive agents in a plurality of after-treatments from solvents that do not remove or react with substantial amounts of agents previously added. The reaction can also be delayed by withholding catalyst until desired operations have been completed. Catalyst can then be added from the vapor phase by milling or by solvents in a manner that will not necessarily extract the desired ingredients from the modified polymer. Furthermore, there is usually sufficient time lag between the addition of the reactive ingredients to the polymer and the final setting to permit working the mixture on hot rolls and adding other agents. Other substances that do not necessarily react with the polymer or the modifying agents such as dyes, pigments, sizes, weighting materials, fillers, and plasticizers such as dibutyl phthalate, tricresyl phosphate, and dibutoxyethyl sebacate, can also be added either at the time that the polymer is in solution or during the period when it can be successfully worked on hot rolls.

Hydrolyzed ethylene-vinyl ester compound interpolymers modified by the chemical interaction with the reactive modifying agents herein disclosed are useful in the manufacture of self-sustaining film for wrapping and packaging, sheeting, fibers, tubing, filaments, molding compositions, rubber substitutes, coatings for fabrics and wire, protective finishes, adhesives for plywood, paper, and textiles, bars and other unsupported massive objects, ribbons, etc.

I claim:

1. A method which comprises reacting a hydrolyzed interpolymer of ethylene and vinyl acetate, in which hydrolyzed interpolymer from 1% to less than 45% of the carbon atoms of the polymer chain are attached to groups from the class consisting of hydroxyl groups and acetate groups, with a compound having a plurality of methylene groups each of which is attached to nitrogen and oxygen, whereby to form a substantially insoluble product having a melting point substantially higher than that of said interpolymer.

2. A method which comprises reacting a hydrolyzed interpolymer of ethylene and vinyl acetate, in which hydrolyzed interpolymer from 8⅓% to 37½% of the carbon atoms of the polymer chain are attached to groups from the class consisting of hydroxyl groups and acetate groups, with a compound having a plurality of methylene groups each of which is attached to nitrogen and oxygen, whereby to form a substantially insoluble product having a melting point substantially higher than that of said interpolymer.

3. A method which comprises reacting a hydrolyzed interpolymer of ethylene and vinyl acetate, in which hydrolyzed interpolymer from 8⅓% to 37½% of the carbon atoms of the polymer chain are attached to groups from the class consisting of hydroxyl groups and acetate groups, with a compound having a plurality of methylene groups each of which is attached to nitrogen and oxygen, in the presence of an acid condensation catalyst, whereby to form a substantially insoluble product having a melting point substantially higher than that of said interpolymer.

4. A method which comprises intimately associating a hydrolyzed interpolymer of ethylene and vinyl acetate, in which hydrolyzed interpolymer from 1% to less than 45% of the carbon atoms of the polymer chain are attached to groups from the class consisting of hydroxyl groups and acetate groups, with a compound having a plurality of methylene groups each of which is attached to nitrogen and oxygen, in an organic solvent medium, evaporating said solvent and heating the solvent-free composition to a temperature of from 70° C. to 200° C., whereby to form a substantially insoluble product having a melting point substantially higher than that of said interpolymer.

5. A product produced by the process of claim 1.

6. The method which comprises intimately associating, in an organic solvent, from 0.1 to 30 parts by weight of dimethylolurea with 100 parts by weight of a hydrolyzed interpolymer of ethylene and vinyl acetate, in which hydrolyzed interpolymer from 8⅓% to 37½% of the carbon atoms of the polymer chain are attached to groups from the class consisting of hydroxyl groups and acetate groups, at least 50% of said groups being hydroxyl groups, evaporating said solvent and heating the solvent-free composition at a temperature within the range of from 70° C. to 200° C., whereby to form a substantially insoluble product having a melting point substantially higher than that of said interpolymer.

7. A product had according to the process of claim 6.

8. The method which comprises intimately associating, in an organic solvent, from 0.1 to 30 parts by weight of N,N'-bis (methoxymethyl)urea with 100 parts by weight of a hydrolyzed interpolymer of ethylene and vinyl acetate, in which hydrolyzed interpolymer from 8⅓% to 37½% of the carbon atoms of the polymer chain are attached to groups from the class consisting of hydroxyl groups and acetate groups, at least 60% of said groups being hydroxyl groups, evaporating said solvent and heating the solvent-free composition at a temperature within the range of from 70° C. to 200° C., whereby to form a substantially insoluble product having a melting point substantially higher than that of said interpolymer.

9. A product had according to the process of claim 8.

10. The method which comprises intimately associating, in an organic solvent, from 0.1 to 30 parts by weight of an alkyl ether of trimethylol melamine with 100 parts by weight of a hydrolyzed interpolymer of ethylene and vinyl acetate, in which hydrolyzed interpolymer from 8⅓% to 37½% of the carbon atoms of the polymer chain are attached to groups from the class consisting of hydroxyl groups and acetate groups, at least 60% of said groups being hydroxyl groups, evaporating said solvent and heating the solvent-free composition at a temperature within the range of from 70° C. to 200° C., whereby to form a substantially insoluble product having a melting point substantially higher than that of said interpolymer.

11. A product had according to the process of claim 10.

DONALD C. PEASE.

Certificate of Correction

Patent No. 2,403,465.

July 9, 1946.

DONALD CARGILL PEASE

It is hereby certified that error appears in the printed specification of the above numbered patent requiring correction as follows: Column 8, line 47, claim 6, for "at least 50%" read *at least 60%*; and that the said Letters Patent should be read with this correction therein that the same may conform to the record of the case in the Patent Office.

Signed and sealed this 17th day of September, A. D. 1946.

[SEAL]

LESLIE FRAZER,
*First Assistant Commissioner of Patents.* parts by weight of an alkyl ether of trimethylol melamine with 100 parts by weight of a hydrolyzed interpolymer of ethylene and vinyl acetate, in which hydrolyzed interpolymer from 8⅓% to 37½% of the carbon atoms of the polymer chain are attached to groups from the class consisting of hydroxyl groups and acetate groups, at least 60% of said groups being hydroxyl groups, evaporating said solvent and heating the solvent-free composition at a temperature within the range of from 70° C. to 200° C., whereby to form a substantially insoluble product having a melting point substantially higher than that of said interpolymer.

11. A product had according to the process of claim 10.

DONALD C. PEASE.

Certificate of Correction

Patent No. 2,403,465.

July 9, 1946.

DONALD CARGILL PEASE

It is hereby certified that error appears in the printed specification of the above numbered patent requiring correction as follows: Column 8, line 47, claim 6, for "at least 50%" read *at least 60%*; and that the said Letters Patent should be read with this correction therein that the same may conform to the record of the case in the Patent Office.

Signed and sealed this 17th day of September, A. D. 1946.

[SEAL]

LESLIE FRAZER,
*First Assistant Commissioner of Patents.*